J. KONIGSBERG.
SHOCK ABSORBER.
APPLICATION FILED JAN. 22, 1921.
1,427,480.  Patented Aug. 29, 1922.
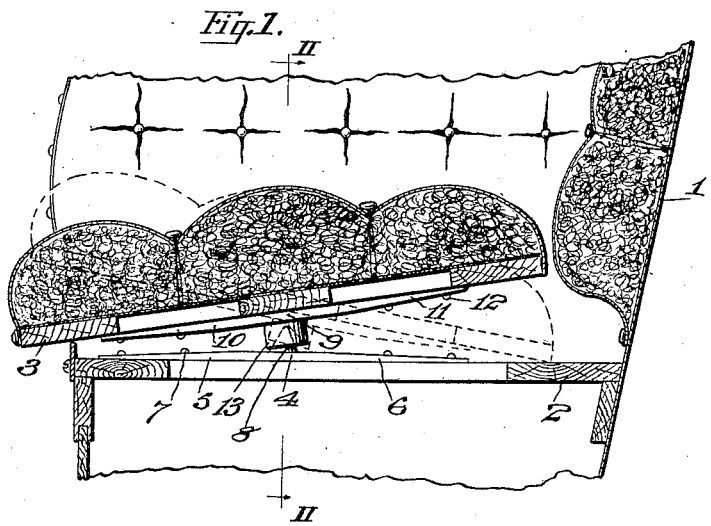
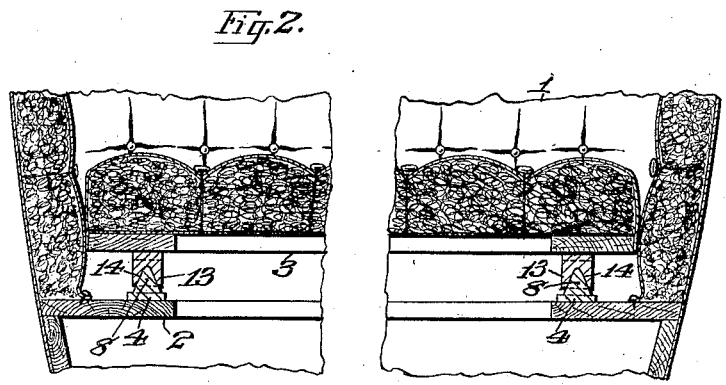
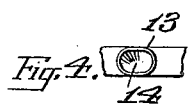 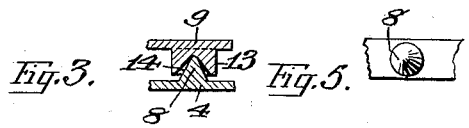 
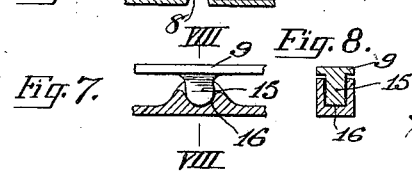
Inventor:—
Joseph Konigsberg
by his attorneys

UNITED STATES PATENT OFFICE.

JOSEPH KONIGSBERG, OF NEW YORK, N. Y., ASSIGNOR TO LENA KONIGSBERG, OF NEW YORK, N. Y.

SHOCK ABSORBER.

1,427,480.           Specification of Letters Patent.    Patented Aug. 29, 1922.

Application filed January 22, 1921. Serial No. 439,208.

*To all whom it may concern:*

Be it known that I, JOSEPH KONIGSBERG, a citizen of the United States, and resident of the borough of Bronx, in the city and State of New York, have invented a new and useful Improvement in Shock Absorbers, of which the following is a specification.

The object of my invention is to provide an automobile with means located between the seat and its support for effectually absorbing the shocks due to the operation of the automobile over rough surface, said means being extremely simple in construction, inexpensive to manufacture, readily attached, requiring no reconstruction or change of the seat and its support, and interfering in no way with the ready removal and replacement of the seat.

My shock absorbing means comprises devices which will permit a limited rocking movement of the seat on its support longitudinally of the automobile, said rocking movement being preferably free.

Practical embodiments of my invention are represented in the accompanying drawings, in which, Fig. 1 represents in longitudinal section so much of an automobile body as will give a clear understanding of my invention.

Fig. 2 represents a transverse vertical section taken in the plane of the line II—II of Fig. 1.

Fig. 3 represents a detail vertical longitudinal section through one of the pairs of members which are located between the seat and its support.

Fig. 4 represents a detail view of the socket member.

Fig. 5 represents a detail view of the lug member.

Fig. 6 represents a detail vertical longitudinal section through a slightly modified form.

Fig. 7 represents a detail view, partly in section and partly in side elevation of a third form.

Fig. 8 represents a cross section taken in the plane of the line VIII—VIII of Fig. 7.

The automobile body is denoted by 1, the seat support by 2 and the seat proper by 3. The means which is interposed between the seat and seat support as illustrated in Figs. 1 to 5 inclusive, comprises pairs of members, one member of each pair being secured to the seat support and the other member of each pair being secured to the bottom of the seat. The lower member 4 may be provided with arms 5 and 6 projecting to the front and rear along the seat support, screws or other suitable fastening devices 7 being employed for securing the lower member 4 to the said seat support. This lower member 4 is provided with an uprising tapered lug 8, in the present instance conical in form.

The upper member 9 may be provided with arms 10, 11 extending to the front and rear along the bottom of the seat 3, screws or other suitable fastening devices 12 being employed for securing the upper member to the seat. This upper member 9 is provided with a depending lug 13 having a flaring socket 14 arranged to receive the uprising lug 8 of the lower member 4. The walls of this socket are so shaped as to permit the free rocking movement of the seat longitudinally of the automobile, the rocking movement of the seat being limited by the engagement of the depressed front or back of the seat with the seat support 2.

While I have shown two of these pairs of members located between the seat and its support, it is obvious that two or more of these pairs may be used.

The corelation of the members of the pairs is such that the lateral movement of the seat on its support is prevented.

In the form shown in Fig. 6, the upper and lower members of each pair are formed of sheet metal and the lugs 8 and 13 are struck from the body of the metal.

In the form shown in Figs. 7 and 8, the upper member 9 is provided with a depending lug 15 and the lower member 4 is provided with a recess 16 for receiving the lug.

In operation: As the automobile travels over rough surfaces, the shocks will be absorbed by the rocking of the seat back and forth and any tendency to throw the occupant off the seat is entirely eliminated. The arrangement of the shock absorber is such that the seat may be readily removed from the seat support to obtain free access to the space within the seat support or for other purposes, and the seat may be just as readily replaced in its proper position on the support.

It is evident that various changes may be resorted to in the construction, form and arrangement of the several parts without departing from the spirit and scope of my invention; hence I do not wish to limit myself to the particular embodiments herein shown and described, but

What I claim is:—

In an automobile, a suitable support, a seat thereon, and shock absorbing means interposed between the support and the opposite ends of the seat, permitting a limited rocking movement of the seat longitudinally of the automobile, said means including pairs of members, one member of a pair being provided with a tapered lug and the other member having a flaring socket for receiving said lug.

In testimony, that I claim the foregoing as my invention, I have signed my name this 6th day of January 1921.

JOSEPH KONIGSBERG.